United States Patent [19]
Baum

[11] 3,920,826
[45] Nov. 18, 1975

[54] METHOD OF TREATING ANTIARRHYTHMIC ACTIVITY WITH BIS[2-(DIALKYLAMINO)ETHOXY]XANTHEN-9-ONE ANTIARRHYTHMIC AGENTS

[75] Inventor: Thomas Baum, Broomall, Pa.

[73] Assignee: American Home Products Corporation, New York, N.Y.

[22] Filed: July 1, 1974

[21] Appl. No.: 484,501

[52] U.S. Cl. .............................................. 424/283
[51] Int. Cl.² ........................................ A61K 31/35
[58] Field of Search ................................... 424/283

[56] References Cited
UNITED STATES PATENTS 3,706,768   12/1972   Bays................................... 424/283
3,821,252   6/1974   Pfister et al........................ 424/283

*Primary Examiner*—Sam Rosen
*Assistant Examiner*—Daren M. Stephens
*Attorney, Agent, or Firm*—Joseph Martin Weigman

[57] ABSTRACT

Certain xanthenones increase the fibrillatory threshold of the left ventricle of a dog. This is an indication of antiarrhythmic acitivity in warm blooded animals. The xanthenones are 1,6-bis[2-(diethylamino)ethoxy]xanthen-9-one, dihydrochloride; 2,6-bis(2-diethylaminoethoxy) xanthen-9-one, dihydrochloride, hydrate; 1,6-bis(2-piperidinoethoxy)xanthen-9-one, dihydrochloride, hydrate; 1,6-bis[2-(diisopropylamino)ethoxy]xanthen-9-one.

4 Claims, No Drawings

METHOD OF TREATING ANTIARRHYTHMIC ACTIVITY WITH BIS[2-(DIALKYLAMINO)ETHOXY]XANTHEN-9-ONE ANTIARRHYTHMIC AGENTS

This invention relates to antiarrhythmic agents and more particularly relates to the use of certain xanthenones as antiarrhythmic agents in warm blooded animals. The xanthenones are 1,6-bis[2-(diethylamino)ethoxy]xanthen-9-one, dihydrochloride; 2,6-bis(2-diethylaminoethoxy)xanthen-9-one, dihydrochloride, hydrate; 1,6-bis (2-piperidinoethoxy)xanthen-9-one, dihydrochloride, hydrate; 1,6-bis[2-(diisopropylamino)ethoxy]xanthen-9-one.

The activity of each compound was determined by the following procedure. The heart of an anesthetized dog is exposed by a left thoracotomy. A Bipolar electrode is sutured to the epicardial surface of the left ventricle. The heart is stimulated with square wave pulses of 3 milliseconds duration and frequency of 60 Hertz for periods of 5 seconds. Voltage is increased until fibrillation ensues. The heart is then defibrillated by direct current countershock and the procedure repeated at 10 minute intervals. Test compounds are administered intravenously over periods of 3 minutes, and fibrillatory threshold examined 10 minutes after start of injection of each dose. Effective antiarrhythmic agents elevate the fibrillatory threshold. Standard compounds are quinidine, procainamide, lidocaine, propranolol. In the foregoing procedure 1,6-bis[2-(diethylamino)ethoxy] xanthen-9-one, dihydrochloride and 2,6-bis (2-diethylaminoethoxy xanthen-9-one, dihydrochloride, hydrate produced a moderate increase in threshold (1.25–2 volts) at a dose of 20 milligrams per kilogram of host body weight.

In the foregoing procedure 1,6-bis(2-piperidinoethoxy) xanthen-9-one, dihydrochloride, hydrate produced a slight increase in threshold (1 volt) at a dose of 20 milligrams per kilogram of host body weight.

In the foregoing procedure 1,6-bis[2-(diisopropylamino)ethoxy]xanthen-9-one produced a marked increase in threshold (greater than 2 volts) at a dose of 20 milligrams per kilogram of host body weight.

When the compounds of this invention are employed as described above, they may be administered alone or in combination with pharmaceutically acceptable carriers, the proportion of which is determined by the solubility and chemical nature of the compound, chosen route of administration and standard pharmaceutical practice. For example they may be administered orally in the form of tablets or capsules containing such excipients as starch, milk, sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, the treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

The compound does not change systemic blood pressure appreciably. The latter acts as a useful attribute of an antiarrhythmic substance.

The preparation of the compounds of this invention may be represented schematically by the following equation:

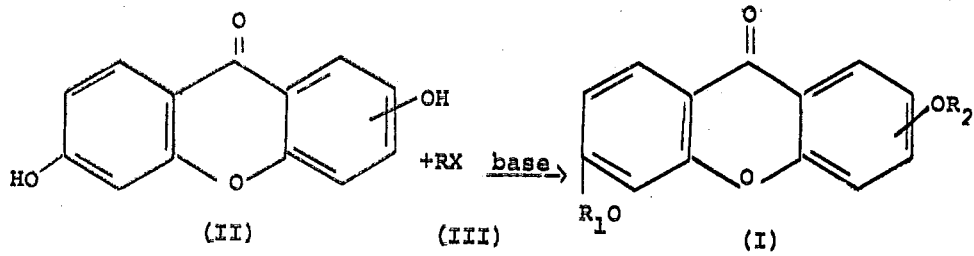

where X is halogen; and $R_1$ and $R_2$ are the same and are 2-(diethyl-amino)ethyl, 2-(diisopropylamino)ethyl and 2-piperidinoethyl.

The starting material 1,6-dihydroxy-9-oxoxanthene is described in P. K. Grover, G. D. Shah and R. C. Shah, J. Chem. Soc. 3982 (1966). The starting material 2,6-dihydroxy-9-oxoxanthene is described in O. P. Mittal and T. R. Seshodri, J. Sci. Ind. Research (India) 14B, 76 (1966) C. A. 49, 8932 (1955).

Compounds of the present invention may be prepared by the following procedure. A stirred mixture of a dihydroxy-9-oxoxanthene of formula II and a halide of di(lower) alkylamino(lower)alkyl or a piperidino(lower)alkyl and a strong base, such as 50 percent sodium hydroxide dispersed in an organic solvent, such as xylene, is heated under reflux for one to 24 hours while water is removed by azeotropic distillation. Alternatively, a strong base such as thallous ethoxide dispersed in an alkanolic solvent, such as methanol and ethanol may be used.

Preferably the mixture is heated for about 6 hours. The product may then be recovered by well known means. For instance, the reaction mixture is filtered and the filtrate extracted with an acidic solution, such as 10 percent hydrochloric acid. The water layer is then basified, for instance to pH 9, with a strong base, such as ammonium hydroxide. The resulting precipitate is removed by filtration and recrystallized, for instance from 50 percent aqueous ethanol. The material is dissolved, for instance in ether, and acidified, for instance with alcoholic hydrochloric acid, to afford the product, bis (substituted alkoxy)xanthen-9-one (I).

The products may be used as prepared or, if desired, may be converted to their hydrate form or to their pharmaceutically acceptable salts, as is well known in the art. The suitable acid-addition salts include those of inorganic acids, such as the hydrohalic acids (for example, hydrochloric and hydrobromic acid), sulfuric acid, nitric acid, boric acid and phosphoric acid, and those of organic acids, such as oxalic, fumaric, tartaric, citric, acetic, succinic and maleic acids.

What is claimed is:

1. A method of treating arrhythmic activity in warm blooded animals comprising administering to a host suffering from arrhythmic activity an antiarrhythmic effective amount of a compound selected from the class consisting of 1,6-bis[2-(diethylamino)ethoxy]xanthen-9-one; 2,6-bis(2-diethyl-aminoethoxy)xanthen-9-one; 1,6-bis[2-(diisopropylamino)ethoxy]xanthen-9-one and their pharmaceutically acceptable addition salt in a pharmaceutically acceptable carrier.

2. A method as defined in claim 1 where the compound is 1,6-bis[2-(diethylamino)ethoxy]xanthen-9-one, dihydrochloride.

3. A method as defined in claim 1 where the compound is 2,6-bis(2-diethylaminoethoxy)xanthen-9-one, dihydrochloride, hydrate.

4. A method as defined in claim 1 where the compound is 1,6-bis[2-(diisopropylamino)ethoxy]xanthen-9-one.

* * * * *